United States Patent
Kwon et al.

(10) Patent No.: US 8,345,571 B2
(45) Date of Patent: Jan. 1, 2013

(54) METHOD FOR TRANSMITTING CHANNEL INFORMATION AND MOBILE COMMUNICATION TERMINAL

(75) Inventors: Yeong Hyeon Kwon, Gyeonggi-do (KR); Seung Hee Han, Gyeonggi-do (KR); Hyun Woo Lee, Gyeonggi-do (KR); Jin Sam Kwak, Gyeonggi-do (KR); Dong Cheol Kim, Gyeonggi-do (KR); Min Seok Noh, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 12/678,934

(22) PCT Filed: Sep. 8, 2008

(86) PCT No.: PCT/KR2008/005297
§ 371 (c)(1),
(2), (4) Date: Mar. 18, 2010

(87) PCT Pub. No.: WO2009/038303
PCT Pub. Date: Mar. 26, 2009

(65) Prior Publication Data
US 2010/0220618 A1    Sep. 2, 2010

Related U.S. Application Data

(60) Provisional application No. 60/974,082, filed on Sep. 21, 2007.

(30) Foreign Application Priority Data

Dec. 18, 2007    (KR) .......................... 10-2007-0133495

(51) Int. Cl.
*G01R 31/08* (2006.01)
*H04W 4/00* (2009.01)

(52) U.S. Cl. ........................................ 370/252; 370/328
(58) Field of Classification Search .................. None
See application file for complete search history.

(56) References Cited

U.S. PATENT DOCUMENTS 7,821,991 B2 * 10/2010 Iwai et al. ..................... 370/328
(Continued)

FOREIGN PATENT DOCUMENTS

KR    10-2007-0080545 A    8/2007
(Continued)

OTHER PUBLICATIONS

Kishiyama, Y., et al., "Investigations of Random Access Channel Structure in Evolved UTRA Uplink," Wireless Communication Systems, 2006. ISWCS '06, 3rd International Symposium on Sep. 6-8, 2006, pp. 287-291.

(Continued)

*Primary Examiner* — Nittaya Juntima
(74) *Attorney, Agent, or Firm* — Birch, Stewart, Kolasch & Birch, LLP

(57) ABSTRACT

A method for transmitting channel information and a mobile communication terminal are disclosed. The method for transmitting channel information includes requesting, by a mobile station (MS) through a random access channel (RACH), a base station (BS) to allocate a resource for transmitting channel information, if it is determined that transmission of a channel status of a downlink channel is necessary as a result of monitoring the channel status, and transmitting, from the MS through the RACH to the BS, the channel information which is updated according to the channel status if the resource allocation is completed. Therefore an existing control channel can be efficiently used, without adding a new control channel for channel quality identifier (CQI) transmission by a mobile station or modifying the configuration of a transmitting stage. Further, signal interference for the existing channels can be prevented when generating a scheduling request.

12 Claims, 12 Drawing Sheets

U.S. PATENT DOCUMENTS

| | | | |
|---|---|---|---|
| 7,881,724 B2* | 2/2011 | Park et al. | 455/452.2 |
| 7,898,948 B2* | 3/2011 | DiGirolamo et al. | 370/230 |
| 7,979,071 B2* | 7/2011 | Kishiyama et al. | 455/436 |
| 8,041,362 B2* | 10/2011 | Li et al. | 455/452.1 |
| 2008/0268785 A1* | 10/2008 | McCoy et al. | 455/67.11 |
| 2009/0022134 A1 | 1/2009 | Chun et al. | |
| 2009/0225701 A1* | 9/2009 | Kwon et al. | 370/328 |

FOREIGN PATENT DOCUMENTS

| | | |
|---|---|---|
| WO | WO 2007/078155 A2 | 7/2007 |

OTHER PUBLICATIONS

Tanno, M., et al., "Evolved UTRA—physical layer overview," Signal Processing Advances in Wireless Communications, 2007, SPAWC 2007, IEEE 8th Workshop on Jun. 17-20, 2007, pp. 1-8.

Intel, "E-UTRA Uplink and Downlink Control Signaling—Text Proposal," TSG-RAN WG1 #45, R1-061534, May 8-12, 2006, Shanghai, China, 3 pages.

Nokia Siemens Network, Nokia, "Uplink Scheduling Request for LTE," Agenda Item 7.13.2, 3GPP TSG RAN WG1 #49, R1-072307, May 7-11, 2007, Kobe, Japan, 2 pages.

Nokia, Nokia Siemens Networks, "CQI Trigger Mechanism," Agenda Item 7.4.5, 3GPP TSG-RAN WG1 Meeting #50, R1-073680, Aug. 20-24, 2007, Athens, Greece, 6 pages.

Panasonic, "CQI Feedback Control and Content in E-UTRA," Agenda Item 7.11.1, 3GPP TSG=RAN WG1 Meeting #48bis, R1-071524, Mar. 26-30, 2007, St. Julians, Malta, 4 pages.

Philips, "Control of CQI Feedback Signalling in E-UTRA," Agenda Item 6.9.1, 3GPP TSG RAN WG1 Meeting #47bis, Tdoc R1-070348, Jan. 15-19, 2007, Sorrento, Italy, 3 pages.

Philips, "CQI Signalling Occasions," Agenda Item 11.1.1, 3GPP TSG RAN WG1 Meeting #45, Tdoc R1-061485, May 8-12, 2006, Shanghai, China, 2 pages.

* cited by examiner

METHOD FOR TRANSMITTING CHANNEL INFORMATION AND MOBILE COMMUNICATION TERMINAL

This application is the National Phase of PCT/KR2008/005297 filed on Sep. 8, 2008, which claims priority under 35 U.S.C. 119 (e) to U.S. Provisional Application No. 60/974,082 filed on Sep. 21, 2007 and under 35 U.S.C. 119 (a) to Patent Application No. 10-2007-0133495 filed in Republic of Korea on Dec. 18, 2007, all of which are hereby expressly incorporated by reference into the present application.

TECHNICAL FIELD

The present invention relates to a method for transmitting channel information, and more particularly, to a method for transmitting channel information to a base station according to determination of a mobile station and resource allocation states of the base station.

BACKGROUND ART

A basic principle of orthogonal frequency division multiplexing (OFDM) is dividing a data stream having a high rate into multiple data streams having a slow rate and simultaneously transmitting the multiple data streams using a plurality of carriers. Each of the plurality of carriers is called a sub-carrier. Even though frequency components of the carriers overlap each other, a receiving stage can detect the carriers due to orthogonality between the plurality of OFDM carriers.

In a communication system, devices, which communicate with each other, confirm each other's channel status and set a communication method, thereby raising efficiency of the communication system. OFDM widely uses a channel-priority scheme in which channel statuses of users are exchanged to provide priority of communication between devices having a good channel status. To obtain multi-user diversity when multiple users are present, a channel status of each user should be discerned as accurately as possible. Especially, since multiple users transmit signals using sub-carries in OFDM, even a variation in frequency of a channel as well as a variation in time of a channel should be definitely transmitted to maximize the use efficiency of a frequency channel.

As a method for generating channel information of a mobile station, the average quality of received signals over all channel bands may be generated and encoded for transmission. Alternatively, differential encoding may be applied using correlation with a previous transmission value. Thus the generated digital channel information is transmitted to a transmitting stage and the transmitting stage chooses a user having a good channel status according to the channel information and generates traffic at a next transmit time interval (TTI). The traffic is modified to transmit values for all frequency bands in OFDM. All the frequency bands are not indicated by one value but the frequency bands are divided into given units. The quality of a received signal of the divided unit is individually calculated and is encoded. Alternatively, differential encoding may be implemented using a correlation relationship between the quality of received signals or using correlation with a previous transmission value. The generated digital channel information, i.e., channel quality information (CQI) is transmitted to the transmitting stage and is used to choose users having a good channel status in a frequency band when selecting users at a next TTI.

A receiving stage measures downlink quality and reports a CQI value selected based on the downlink quality to a base station through an uplink control channel. The transmitting stage performs downlink scheduling such as the selection of a mobile station and the allocation of resources according to the reported CQI.

FIG. 1 illustrates an example of a wireless communication system.

Referring to FIG. 1, a wireless communication system 100 may be comprised of a base station (BS) 110, and a plurality of mobile stations (MSs) 120, 130, and 140. The base station transmits and receives data to and from the plurality of mobile stations through a downlink channel 115 communicating commonly with the mobile stations and through uplink channels 125, 135, and 145 communicating individually with the mobile stations.

In a mobile communication system, link adaptation is used to maximize utilization of given channel capacity. The link adaptation provides a method for controlling a modulation and coding scheme (MCS) and transmission power according to a given channel. For a transmitting stage to perform the link adaptation, a receiving stage feeds back channel information.

The channel information, e.g., channel quality information (CQI) or channel status information (CSI) is transmitted to the transmitting stage from the receiving stage. A transmission scheme differs depending on which side starts transmission. Hereinafter, CQI will be described as an example of the channel information.

A channel information transmission scheme may include an event-triggered CQI reporting, periodic CQI reporting, and on-demand CQI reporting. In the event-triggered CQI reporting, if the receiving stage determines a difference between a packet transmitting/receiving scheme and a channel or a channel status becomes different from a previous channel state, the transmitting stage transmits the channel information when abnormality occurs in statistical features of a packet (average packet error rate/bit error rate, response delay, etc.). The periodic CQI reporting serves to transmit the channel information of a user through predetermined resources at regular intervals. The on-demand CQI reporting serves to command the receiving stage to transmit the channel information at a time point demanded by the transmitting stage.

DISCLOSURE

Technical Problem

A method for transmitting channel information is needed to efficiently use resources in a mobile communication system while maintaining compatibility with an existing system.

Therefore, an object of the present invention is to provide a method for transmitting channel information, which is capable of efficiently using an existing control channel, without adding a new control channel for CQI transmission by a mobile station or modifying the configuration of a transmitting stage.

Another object of the present invention is to provide a mobile communication terminal to which the above channel information transmission method is applied.

Technical Solution

To achieve the first object of the present invention, an aspect of the present invention provides a method of transmitting channel information, including requesting, by an MS through a predefined access channel (e.g., an random access channel, a resource request channel, etc.), a BS to allocate a resource for transmitting channel information, if the channel information is not suitable for a transmission mode or a channel status becomes different from previous channel status (e.g., a variation in channel status, a transmission error of previous channel information, etc.) as a result of monitoring the channel status of a downlink channel, and transmitting, from the MS through the random access channel to the BS, the channel information which is updated according to the channel status if the resource allocation is completed.

The predefined access channel may be dedicatedly allocated to transmit the channel information.

In requesting the BS to allocate the resource, an access reason may be transmitted to the BS through the random access channel if the predefined access channel is not dedicatedly allocated to transmit the channel information.

In requesting the BS to allocate the resource, an access reason may be transmitted to the BS through the random access channel if the random access channel is not dedicatedly allocated to transmit the channel information.

In requesting the BS to allocate the resource, the MS may simultaneously transmit an access sequence and the access reason to the BS.

To achieve the first object of the present invention, another aspect of the present invention provides a method of transmitting channel information, including requesting, by an MS through a scheduling request channel, that a BS allocate a resource for transmitting channel information, if a channel status of a downlink channel is not suitable for a transmission mode of the downlink channel or the channel status becomes different from previous channel status, and transmitting, from the MS through the scheduling request channel to the BS, the channel information which is updated according to the channel status if the resource allocation is completed.

In requesting that the BS allocate the resource, an access reason may be transmitted to the BS if the resource allocated by the BS is not sufficient for transmission of the channel information.

In requesting that the BS allocate the resource, the MS may transmit a scheduling request to the BS.

In requesting that the BS allocate the resource, an access reason may be added to a scheduling request.

In requesting that the BS allocate the resource, a buffer size necessary for the MS may be added to a scheduling request.

In requesting that the BS allocate the resource, the amount of the resource necessary for the MS may be added to a scheduling request.

To achieve the first object of the present invention, still another aspect of the present invention provides a method of transmitting channel information, including transmitting, from an MS to a BS, a control signal directing the BS not to decode a dedicated channel, wherein the dedicated channel is used to transmit channel information, and transmitting, from the MS through the dedicated channel to the BS, the channel information which is updated according to a channel status, if the channel status is different from previous channel information as a result of monitoring the channel status by the MS.

In transmitting the channel information to the BS, the MS may transmit a control signal which directs the BS to decode the dedicated channel through a channel other than the dedicated channel to the BS.

To achieve the second object of the present invention, an aspect of the present invention provides an MS, including a channel status measurement portion to monitor a channel status of a downlink channel, a random access portion to request, through a random access channel, that a BS allocate a resource for transmitting channel information, if the channel status becomes different from previous channel status or the channel status is not suitable for a downlink transmission mode as the result of monitoring the channel status, and a channel status report portion to transmit, from the MS through the random access channel to the BS, the channel information which is updated according to the channel status if the resource allocation is completed.

To achieve the second object of the present invention, another aspect of the present invention provides an MS station, including a channel status measurement portion to monitor a channel status of a downlink channel, a scheduling request portion to request, through a scheduling request channel, that a BS allocate a resource for transmitting channel information, if the channel status becomes different from previous channel information or the channel status is not suitable for a packet transmission mode as the result of monitoring the channel status, and a channel status report portion to transmit, through the scheduling request channel to the BS, the channel information which is updated according to the channel status if the resource allocation is completed.

To achieve the second object of the present invention, still another aspect of the present invention provides an MS, including a dedicated channel management portion to transmit to a BS a control signal directing the BS not to decode a dedicated channel, wherein the dedicated channel is used to transmit channel information, a channel status measurement portion to monitor a channel status downlink channel, and a channel status report portion to transmit, through the dedicated channel to the BS, the channel information which is updated according to the channel status if the channel status becomes different from previous channel information or the channel status is not suitable for a packet transmission mode as the result of monitoring the channel status.

Advantageous Effects

According to the embodiments of the present invention, transmission of event-triggered CQI is started by a receiving stage and the CQI is transmitted using existing channels. A mobile station can effectively use the existing control channels without adding a new control channel for CQI transmission or modifying the configuration of a transmitting stage. Further, signal interference for the existing channels can be prevented when generating a scheduling request. The embodiments of the present invention can be applied irrespective of a type of a sequence used between a transmitting stage and a receiving stage and provide flexibility to a control signal system. When combining the embodiments of the present invention, a proper CQI transmission procedure can be applied according to the resource allocation state of a base station.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The exemplary embodiments of the present invention will now be described with reference to the accompanying drawings. The following exemplary embodiments of the present invention may be modified in various forms and the scope of the present invention should not be limited to the specific embodiments described herein.

Figure 1:
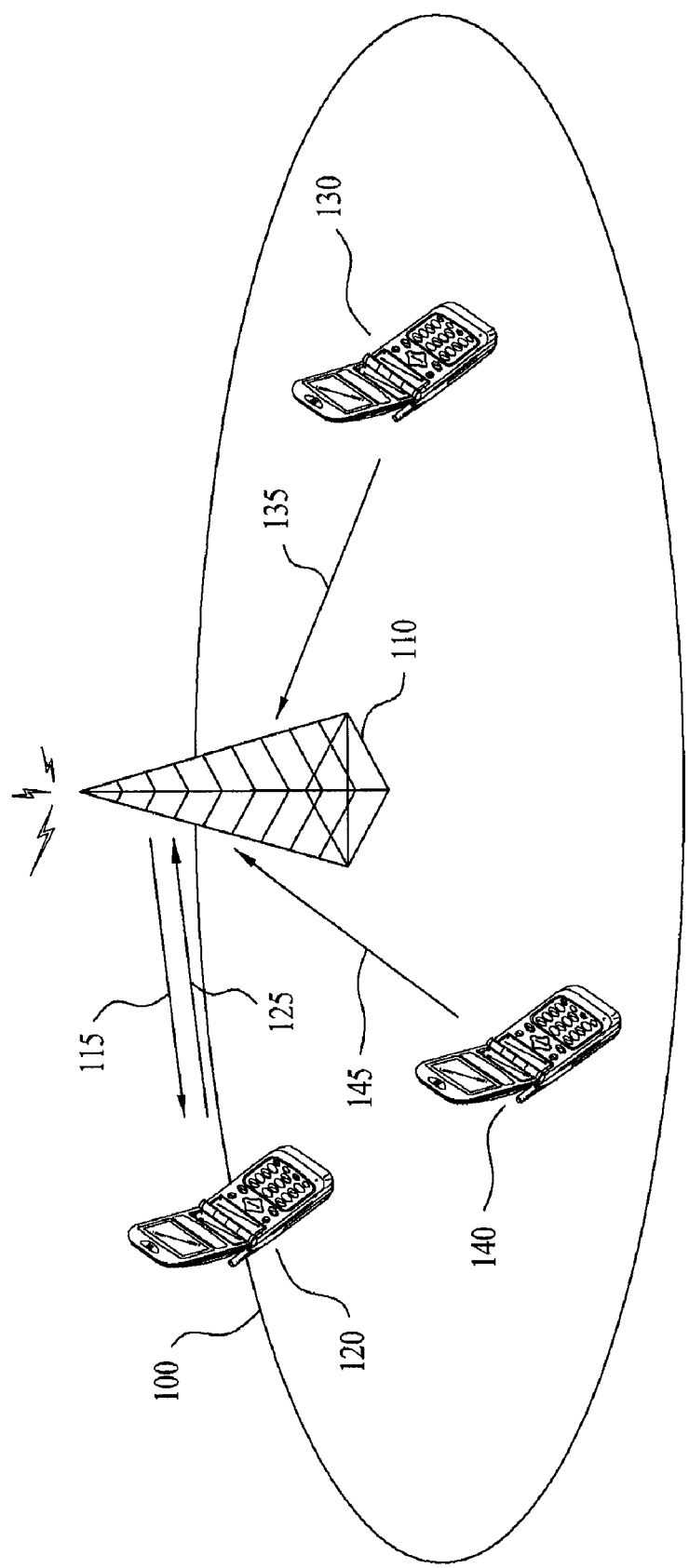
FIG. 1 illustrates an example of a wireless communication system.
Figure 2:
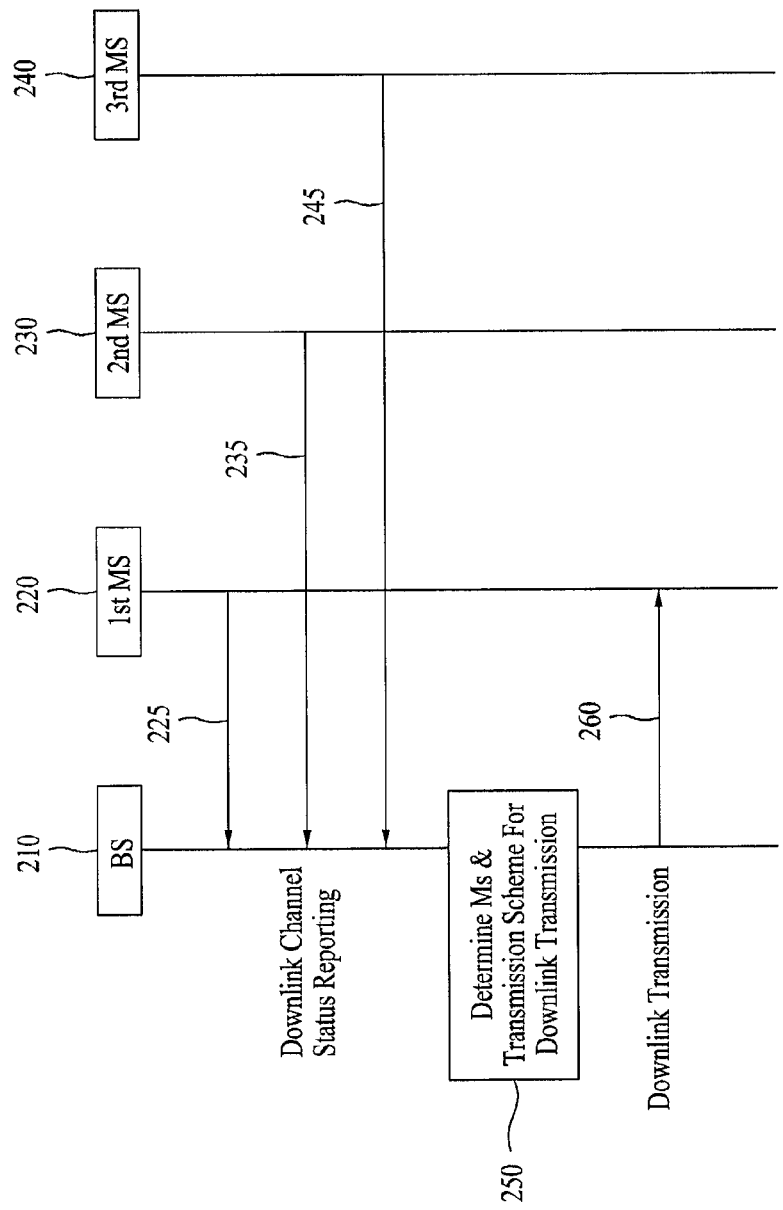
FIG. 2 illustrates a transmitting and receiving process between MSs and a BS in a wireless communication system to which the present invention is applied.

FIG. 2 illustrates a transmitting and receiving process between mobile stations (MSs) and a base station (BS) in a wireless communication system to which the present invention is applied.

MSs 220, 230, and 240 reports downlink channel statuses thereof to a BS 210 through uplink channels in steps 225, 235, and 245. The BS 210 performs a high scheduling process and an adaptive modulation coding process based on the downlink channel information of the MSs and determines an MS having a good channel status in step 250. The BS 210 transmits a data packet to the MS having a good channel status through a downlink channel in step 260.

Hereinafter, CQI as channel information will be described by way of example.

In the exemplary embodiment of the present invention, if an MS, that is, a receiving stage senses an abrupt variation in channel while monitoring a channel status, the receiving stage transmits the channel variation to a BS, that is, a transmitting stage. In other words, if CQI transmitted previously to the transmitting stage becomes different from a current channel status, the previously transmitted CQI becomes meaningless, or a packet transmission mode is not suitable for a channel status, the receiving stage transmits the channel variation to the transmitting stage. To this end, the receiving stage may inform the transmitting stage of a variation time point through a random access channel (RACH) or another determined channel. In this case, a usable channel includes a ranging channel, a scheduling request channel, etc. in addition to the RACH. The channel information may be transmitted using a medium access control (MAC) packet such as L2/L3.

A CQI value may refer to a signal to interference plus noise ratio (SINR), a carrier to interference plus noise ratio (CINR), a bit error rate (BER) or a frame error rate (FER) of a channel, or a value obtained by calculating such information as data which can be transmitted. In a multiple-input multiple-output (MIMO) system, information indicating a channel status such as rank information (RI) and precoding matrix information (PMI) may be added to the CQI value.

The RACH is generally used to adjust synchronization with the BS but may be used as a means by which an MS receives allocated resources. To transmit CQI, since the BS should allocate a given amount of resources to the MS, the MS may transmit a purpose, i.e., an access reason to the BS while accessing the RACH. At this time, the MS may further transmit MS information, for example, an MS identifier (ID) to the BS when accessing a CQI RACH transmission, which will be referred to as CQI RACH.

If the CQI RACH allocation exists, an MS which needs to update CQI information accesses the BS through the CQI RACH. In this case, the MS may not transmit the access reason to the BS, and a synchronous RACH or an asynchronous RACH may be used. Meanwhile, the CQI RACH can simply indicate only any event, resources for transmitting an MS ID should be further allocated in addition to a sufficient amount of resources for transmitting a CQI value when allocating resources for CQI. To clarity an MS ID, a sequence to be used may be previously allocated to the MS. If the BS detects a specific sequence, this leads to an effect that a connection ID (CID) of a corresponding MS can be automatically recognized.

Figure 3:
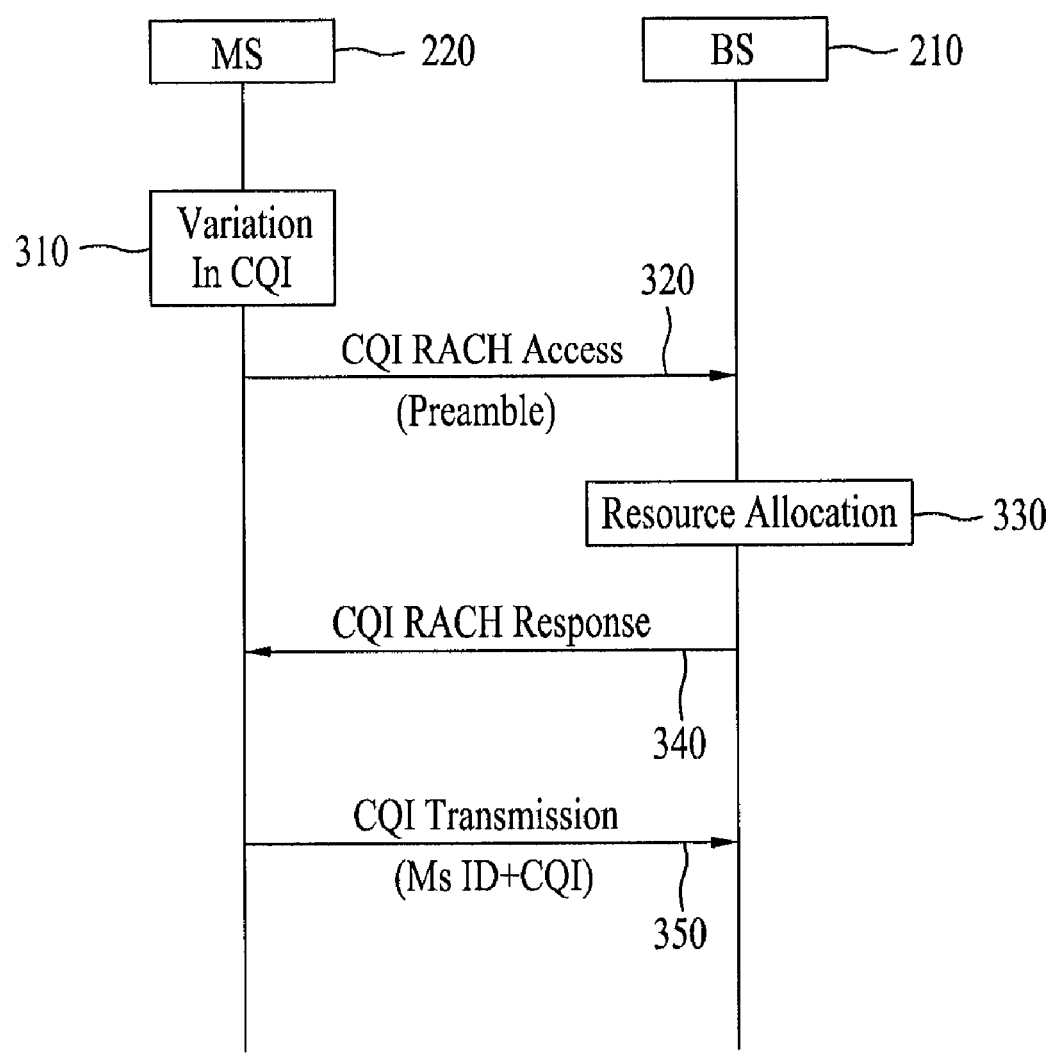
FIG. 3 illustrates a signal flow of a channel information transmitting process when a CQI RACH exists according to an exemplary embodiment of the present invention.

FIG. 3 illustrates a signal flow of a channel information transmitting process when a CQI RACH exists according to an exemplary embodiment of the present invention.

If an MS 220 determines that a report on a current channel status due to a variation in previous CQI and current CQI is necessary as a result of monitoring a downlink channel in step 310, the MS 220 transmits a preamble to a BS 210 to access a CQI RACH in step 320. If the CQI RACH is short of bit space to transmit data, the BS 210 additionally allocates necessary resources upon receipt of the preamble from the MS 220.

The BS 210 allocates necessary resources to the MS 220 in step 330 and transmits a CQI RACH response to the MS 220 in step 340. Then the MS 220 transmits CQI which includes a current channel status through the CQI RACH to the MS 210 together with an MS ID in step 350. Namely, if the CQI RACH has a sufficient bit space, the MS 220 may simultaneously transmit at least one of the CQI and the MS ID to the BS 210 through the CQI RACH.

If no CQI RACH exists, the MS may inform the BS of start of CQI transmission through at least one predetermined RACH. In this case, the MS may inform the BS of access through an RACH and thereafter may notify the BS that it is an object to transmit CQI in the process of negotiation of the RACH.

Figure 4:
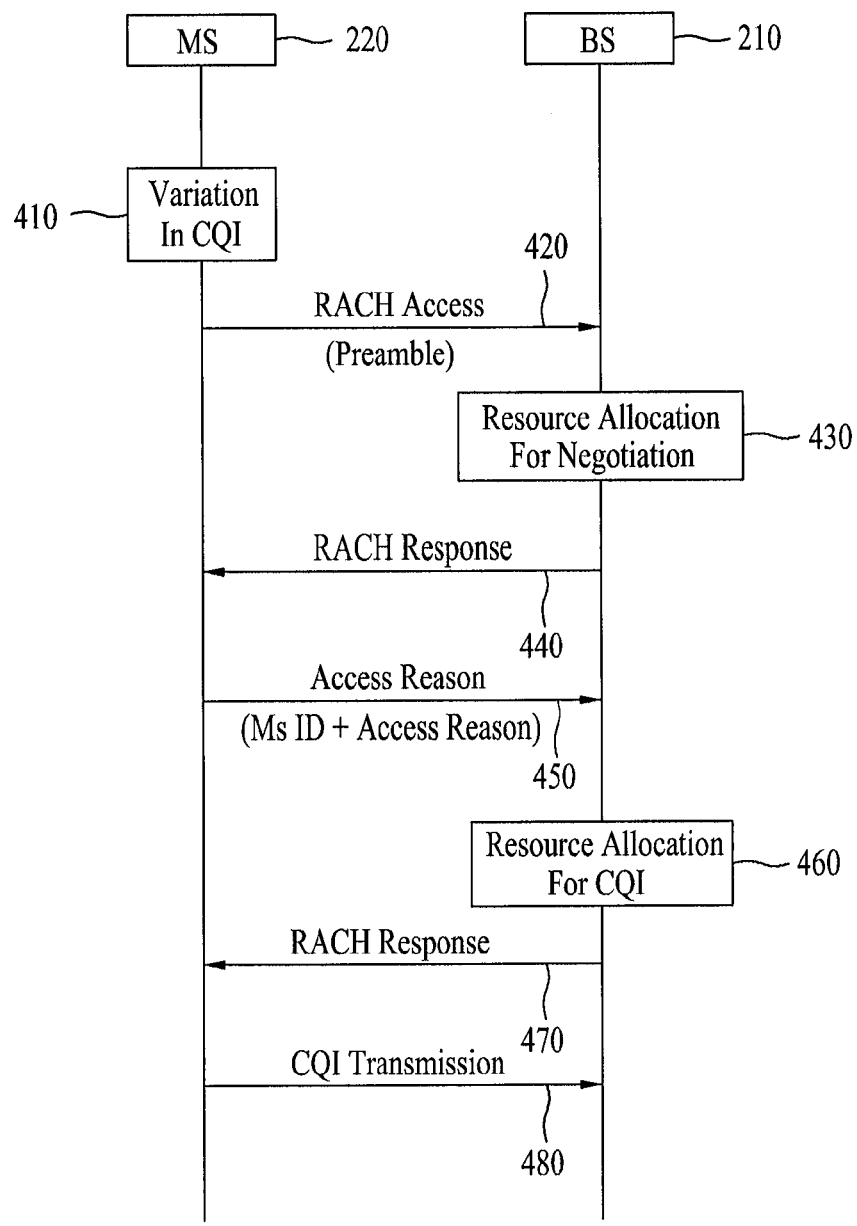
FIG. 4 illustrates a signal flow of a channel information transmitting process when a general RACH exists according to an exemplary embodiment of the present invention.

FIG. 4 illustrates a signal flow of a channel information transmitting process when a general RACH exists according to an exemplary embodiment of the present invention.

If an MS 220 determines that it is necessary to report a current channel status due to a variation in previous CQI and current CQI as a result of monitoring a downlink channel in step 410, the MS 220 transmits a preamble to a BS 210 to access an RACH in step 420.

As illustrated in FIG. 4, if the MS 220 transmits only the preamble (e.g., access sequence information) when accessing the BS 210 through the RACH, the MS 220 may inform the BS 210 of an access reason thereof in the next message transmitting step.

The BS 210 allocates necessary resources for negotiation with the MS 220 in step 430 and transmits an RACH response to the MS 220 in step 440. The MS 220 transmits an access reason indicating that MS is to transmit CQI which includes a current channel status to the BS 210 together with an MS ID through the RACH in step 450. The MS 200 may inform the BBS 210 of the amount of CQI to be transmitted in the process of negotiation.

Through a negotiation process, if the BS 210 confirms that the access of the MS 220 is to transmit the CQI from the access reason of the MS 220, the BS 210 allocates resources according to the amount of CQI required by the MS to the MS 220 in step 460.

Next, the BS 210 transmits an RACH response to the MS in step 470, and then the MS 220 transmits CQI of a current channel status to the BS 210 through the RACH in step 480.

Figure 5:
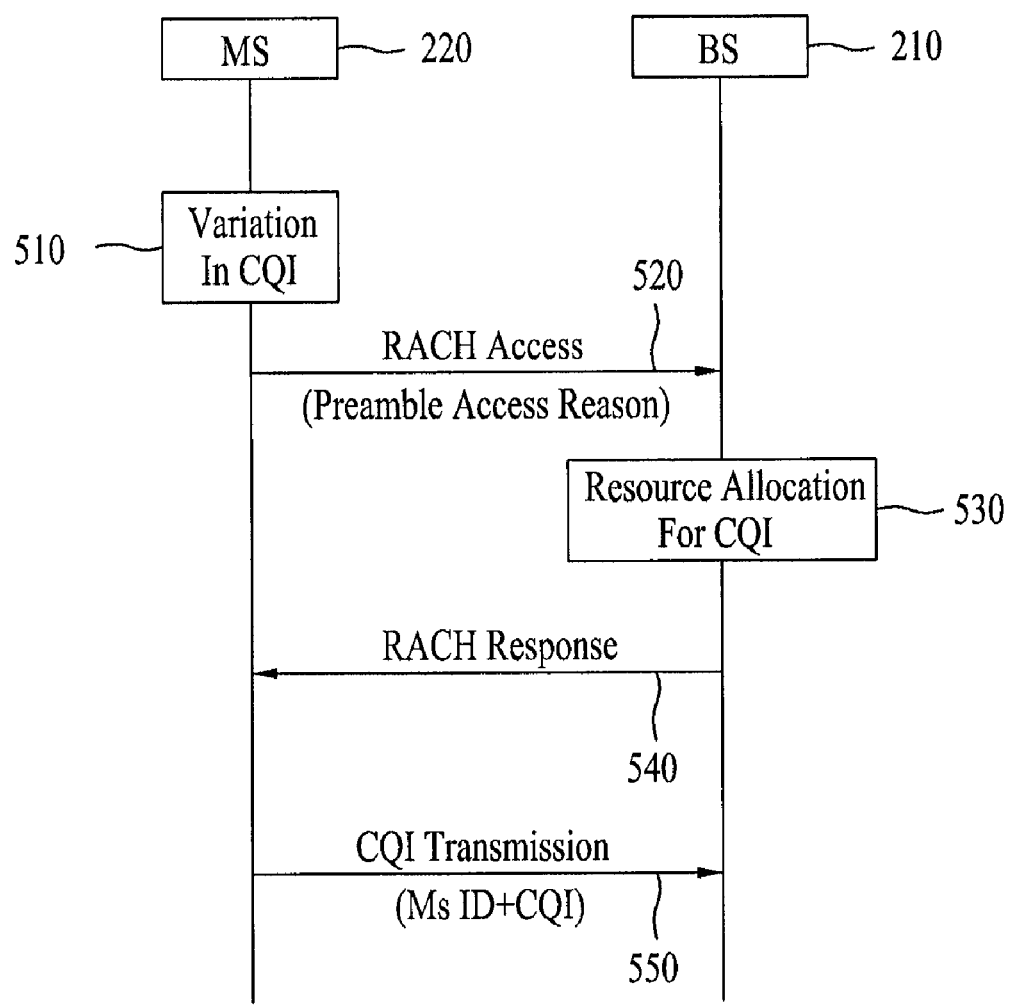
FIG. 5 illustrates a signal flow of a channel information transmitting process when a general RACH exists and an access reason can be initially transmitted to a BS according to an exemplary embodiment of the present invention.

FIG. 5 illustrates a signal flow of a channel information transmitting process when a general RACH exists and an access reason can be initially transmitted to a BS according to an exemplary embodiment of the present invention.

As illustrated in FIG. 5, if the MS 220 can access an RACH and at the same time transmit data, the MS 220 may inform the BS 210 of an access reason thereof as data information when transmitting a preamble.

If an MS 220 determines that it is necessary to report a current channel status due to a variation in previous CQI and current CQI as a result of monitoring a downlink channel in step 510, the MS 220 transmits a preamble and an access reason thereof to the BS 210 to access an RACH in step 520. In this case, the MS 220 may transmit the amount of CQI to be transmitted by being included in a data part of the RACH to the BS 210.

If the BS 210 confirms that the access of the MS 220 is to transmit the CQI from the access reason of the MS 220, the BS 210 allocates resources to the MS 220 according to the amount of CQI required by the MS 220 in step 530.

Next the BS 210 transmits an RACH response to the MS 220 in step 540, and the MS 220 transmits CQI of a current channel status to the MS 210 through the RACH in step 550.

If the MS 220 accesses the BS 210 using an RACH, the BS 210 can not recognize that which MS has been accessed. Accordingly, the CQI should have a rule indicating that the CQI is information for a specific MS. To this end, the MS may encode MS information, for example, an MS ID (temporal ID of an MS or permanent ID of an MS) in a physical layer or an MS ID in a MAC layer, together with CQI.

Accordingly, rather than simply encoding a CQI value during transmission of CQI, the MS may mask an MS ID in digital bits of CQI or insert/include an MS ID before and after CQI encoding, so that the BS can check request of a corresponding MS using an MS ID. At this time, masking may use an exclusive OR (XOR) operation.

Figure 6:
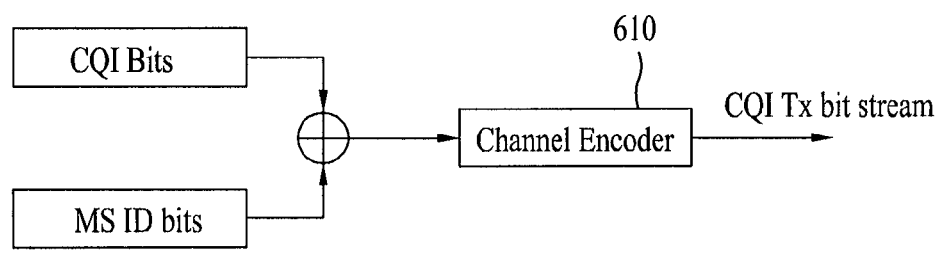
FIG. 6 illustrates a process of masking an MS ID in CQI source bits according to an exemplary embodiment of the present invention.

FIG. 6 illustrates a process of masking an MS ID in CQI source bits according to an exemplary embodiment of the present invention.

If the BS has previously known information of an MS which is to transmit CQI, the MS can mask an MS ID in a CQI value as illustrated in FIG. 6. A channel encoder 610 converts bits in which CQI bits and MS ID bits are masked into a CQI transmission bit stream.

Figure 7:
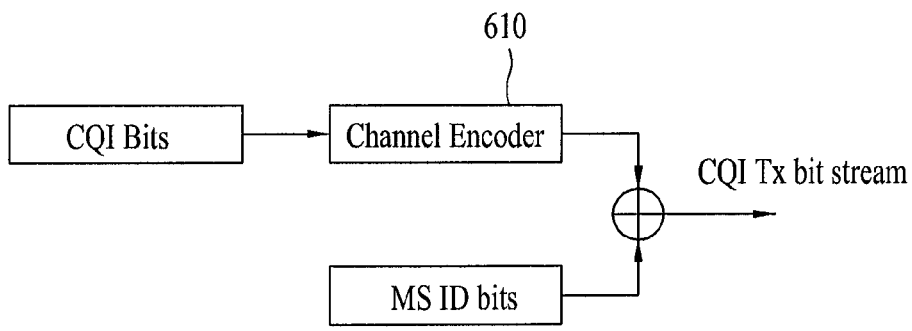
FIG. 7 illustrates a process of masking an MS ID in CQI channel bits according to an exemplary embodiment of the present invention.

FIG. 7 illustrates a process of masking an MS ID in CQI channel bits according to an exemplary embodiment of the present invention.

If a BS does not know an MS which is to transmit CQI, the MS masks an MS ID in CQI channel bits which are encoded by a channel encoder 610 and generates a CQI transmission bit stream. The channel encoder 610 converts CQI digital bits into another digital sequence or analog sequence so that the converted sequence can be strongly decoded in a receiving stage. The base station may read the MS ID by decoding a signal of the MS, that is, the CQI transmission bit stream.

In FIG. 6 and FIG. 7, if the length of the MS ID is longer than the length of the CQI bits, only a part of the MS ID, that is, bits of the MS ID of the same length as the CQI bits, based on the most significant bit (MSB) or the least significant bit (LSB) of the MS ID, may be masked in the bit stream. If the length of the MS ID is shorter than the length of the CQI bits, sequentially masking bits starting from the MSB or LSB of the MS ID in the bit stream may be repeated.

If a dedicated access channel for allocating resources to the MS, for example, a scheduling request channel exists, the MS may start CQI transmission using the scheduling request channel.

Although a channel which can be used only by the MS may be simply employed only to transmit scheduling request information, if additional bits can be added to the scheduling request, CQI or control channel information (e.g., acknowledgement (ACK)/negative acknowledgement (NACK), handover, etc.) and MS status information (e.g., buffer status, priority information, etc.) may be transmitted by being added to the additional bits. Therefore, even though CQI is transmitted through a dedicated channel, a process of indicating CQI through multiple steps and a process of transmitting an indication while transmitting an initial scheduling request may be performed.

A format transmitting a scheduling request (SR) may be divided as follows.

TABLE 1

| | Non-coherent Transmission | Coherent Transmission |
|---|---|---|
| SR only | Signal existence indicates SR | Always signal exists with BPSK modulation for SR |
| SR+ additional information | SR detection by signal existence Additional information from modulation information | SR and additional information forms modulation symbols on SR channel |

If the scheduling request channel is configured such that only the scheduling request can be singly transmitted, only one bit indicating whether the scheduling request exists is permitted. In triggered CQI, when negotiating a reason for scheduling request from a BS by transmitting one-bit information by scheduling request, an MS may inform a BS that an access reason is transmitting CQI.

If the scheduling request channel is configured such that only the scheduling request can be singly transmitted, two or three steps may be configured according to a response type of the BS to the scheduling request.

Figure 8:
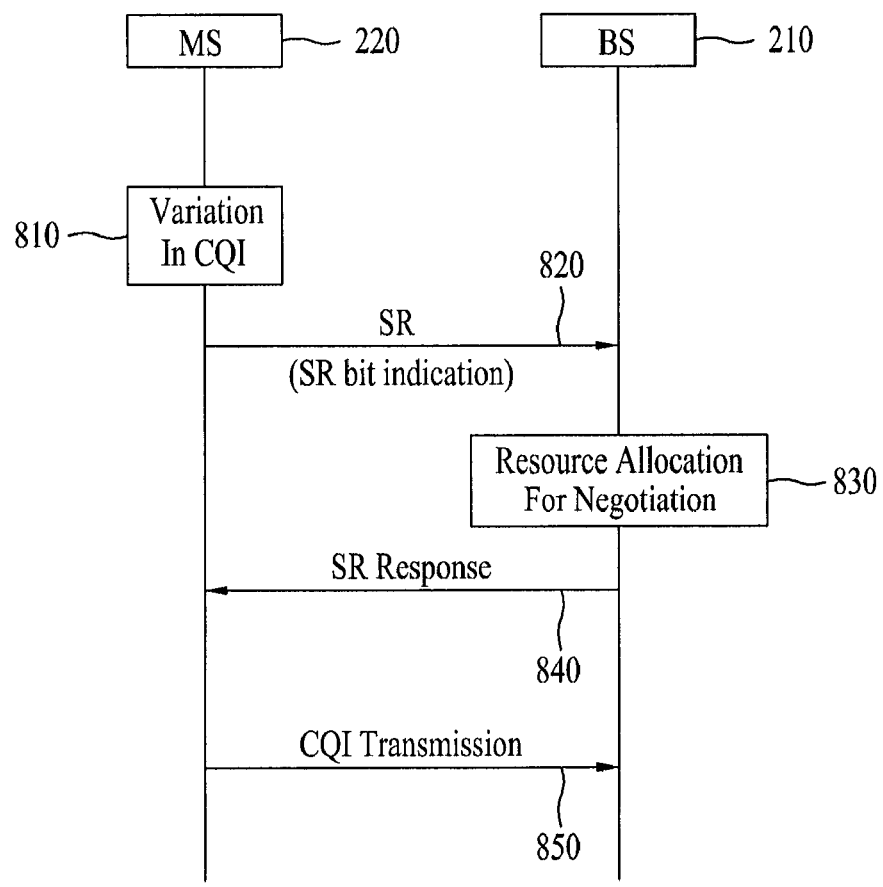
FIG. 8 illustrates a signal flow of a channel information transmitting process when a BS allocates sufficient resources in response to a scheduling request according to another exemplary embodiment of the present invention.

FIG. 8 illustrates a signal flow of a channel information transmitting process when a BS allocates sufficient resources in response to a scheduling request according to another exemplary embodiment of the present invention.

In FIG. 8, information transmitted by an MS 220 may include a bit indication to represent CQI. Namely, the bit indication representing whether the MS transmits CQI has a format different from a bit indication representing whether the MS transmits buffer size negotiation or indication reason.

If the BS 210 allocates resources which can transmit CQI to the MS 220 in an initial resource allocating process, the MS 220 can directly transmit the CQI after receiving a scheduling request response.

If the MS 220 determines that it is necessary to report a current channel status due to a variation in previous CQI and current CQI as a result of monitoring a downlink channel in step 810, the MS 220 transmits a scheduling request (SR) bit indication to the BS 210 to perform a scheduling request process in step 820.

The BS 210 allocates resources sufficient for the MS 220 to transmit the CQI to the MS 220 while allocating resources for negotiation in step 830 and transmits a scheduling request response to the MS 220 in step 840. The MS 220 transmits CQI of a current channel status to the BS 210 through a scheduling request channel in step 850.

Figure 9:
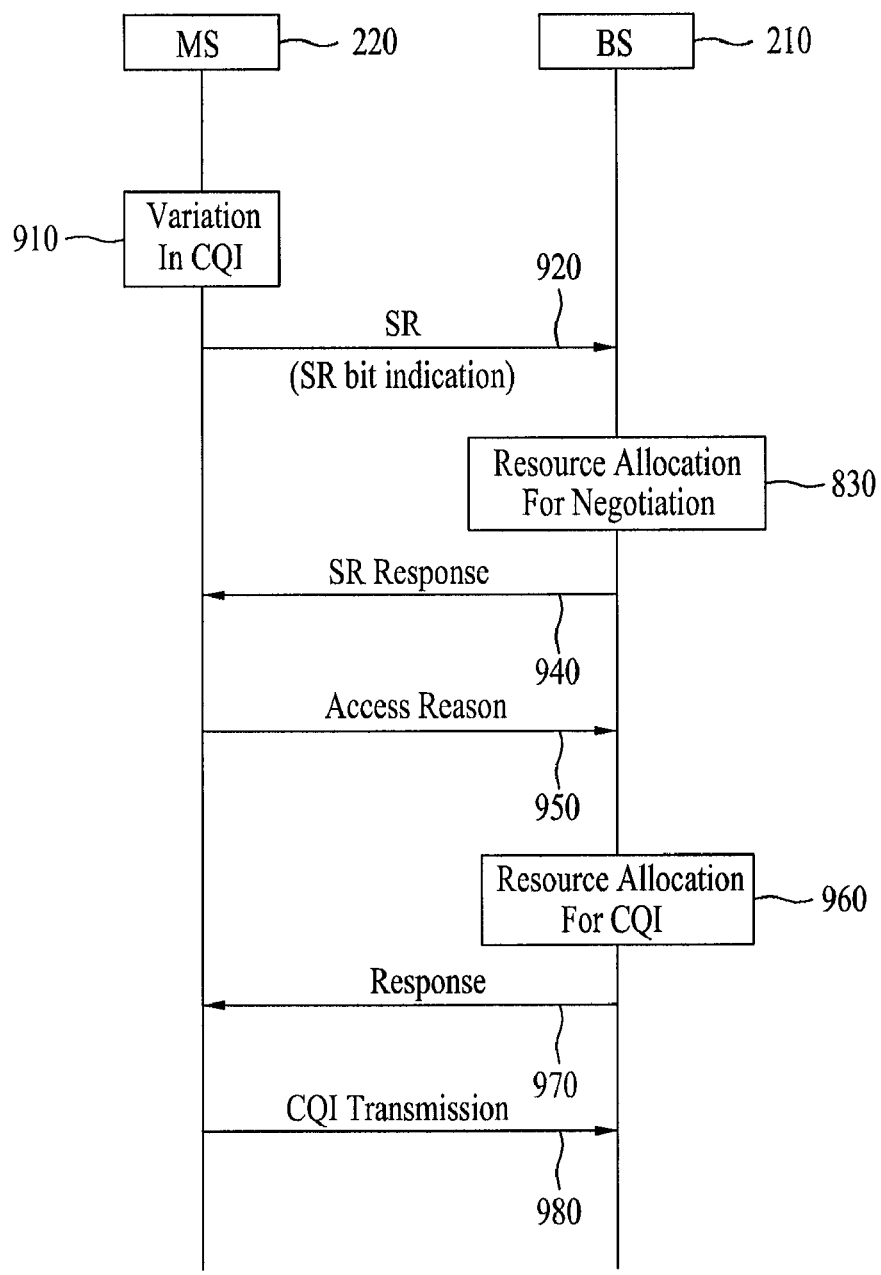
FIG. 9 illustrates a signal flow of a channel information transmitting process when a BS allocates insufficient resources in response to a scheduling request according to another scheduling request according to an exemplary embodiment of the present invention.

FIG. 9 illustrates a signal flow of a channel information transmitting process when a BS allocates insufficient resources in response to a scheduling request according to a scheduling request according to another exemplary embodiment of the present invention.

If resources for negotiation for a scheduling request allocated by a BS are too small to transmit CQI, three steps as shown in FIG. 9 are needed.

If an MS 220 determines that it is necessary to report a current channel status due to a variation in previous CQI and current CQI as a result of monitoring a downlink channel in step 910, the MS 220 transmits a scheduling request bit indication to the BS 210 to perform a scheduling request process in step 920.

The BS 210 allocates resources insufficient for the MS 220 to transmit the CQI to the MS 220 while allocating resources for negotiation in step 930 and transmits a scheduling request response to the MS 220 in step 940. The MS 220 transmits to the BS 210 an access reason indicating that the MS 220 is to transmit the CQI in step 950.

If the BS 210 confirms that access of the MS 220 is to transmit the CQI from the access reason of the MS 220, the BS 210 allocates resources to the MS 220 according to the amount of CQI transmission necessary for the MS 220 in step 960.

The BS 210 transmits a response to the MS 220 in step 970, and the MS 220 transmits the CQI of a current channel status to the BS 210 through a scheduling request channel in step 980.

If the scheduling request channel has a structure in which a scheduling request and additional information caused by additional bits can be simultaneously transmitted, the MS can control the amount of resources which should be allocated by the BS through the additional information. Namely, it is possible to directly indicate that the scheduling request is for CQI and to use bits so as to control only a buffer size, through the additional information bits. If the CQI is indicated by one-bit information or one option among various combinations, the BS allocates resources which can transmit the CQI. As another method, an indication of the amount of resources may be directly indicated by a bit indication so that the resources sufficient for transmission of the CQI can be allocated.

Figure 10:
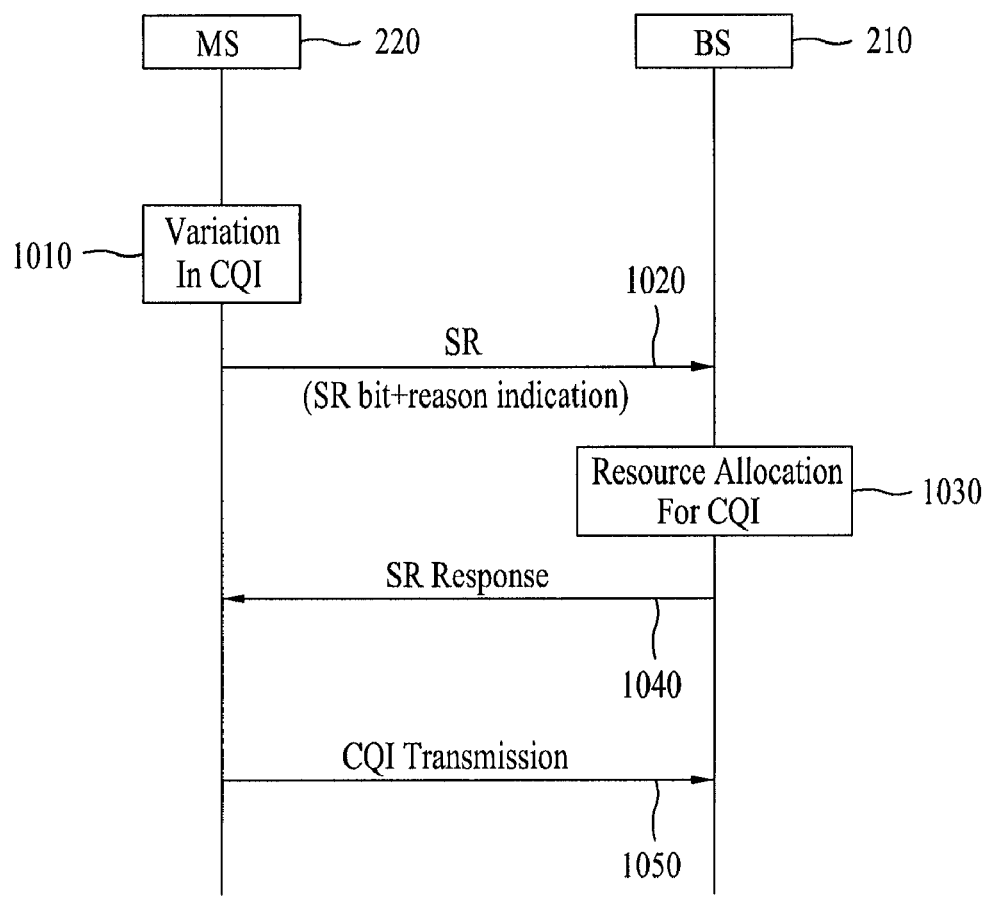
FIG. 10 illustrates a signal flow of a channel information transmitting process when an MS can transmit additional bits in addition to a scheduling request according to another exemplary embodiment of the present invention.

FIG. 10 illustrates a signal flow of a channel information transmitting process when an MS can transmit additional bits in addition to a scheduling request according to another exemplary embodiment of the present invention.

If an MS 220 determines that it is necessary to report a current channel status due to a variation in previous CQI and current CQI as a result of monitoring a downlink channel in step 1010, the MS 220 transmits scheduling request bit indication and a reason indication for an access reason to the BS 210 to perform a scheduling request process in step 1020. The access reason may be CQI or a buffer size.

The reason indication for an access reason may be transmitted to the BS 210 through additional bits. The following Table 2 illustrates a CQI indicating method and processing methods only using the buffer size when the number of additional bits is one and two.

TABLE 2

| Additional bit | CQI Indication | Indirect Indication |
|---|---|---|
| 1 bit | State: data or CQI | State: resource allocation or multiple negotiation |
| 2 bits | State: data or CQI or real time or others<br>Bit 1: buffer size<br>Bit 2: CQI or not (data) | State: resource allocation or multiple negotiation or real time or others<br>Bit 1: buffer size<br>Bit 2: real time or not (best effort) |

If the BS 210 confirms that the scheduling request of the MS 220 is to transmit the CQI from the access reason of the MS 220, the BS 210 allocates resources to the MS 220 according to the amount of CQI transmission necessary for the MS 220 in step 1030.

The BS 210 transmits a scheduling request response to the MS 220 in step 1040 and the MS 220 transmits CQI for a current channel status through a scheduling request channel in step 1050.

A method for transmitting channel information according to a further exemplary embodiment of the present invention assumes that a dedicated CQI channel is assigned to the MS.

Similarly to a periodic CQI reporting scheme, if a dedicated CQI channel is assigned to the MS, the MS may transmit the CQI through the dedicated CQI channel. That is, although the MS receives resources for CQI transmission at an arbitrary time. Since the BS simply allocates the resources, the MS may transmit or may not transmit CQI at that time point. Further, since the BS determines that the CQI is to be transmitted through the allocated resources, the BS may not detect the CQI when the MS does not transmit the CQI to the BS. Namely, the MS may always transmit the CQI through a corresponding resource or may transmit simple signal (e.g., a single tone), a timer burst on a reserved resource, etc. to the MS to reduce radiation power. Therefore, the BS may not decode a corresponding channel except for a necessary case.

Thus the further exemplary embodiment of the present invention includes a process of transmitting a control signal directing the BS not to decode a dedicated channel, when the dedicated channel for transmitting channel information to the MS exists and when transmission of current channel information is not required. A still further exemplary embodiment of the present invention includes a process of transmitting updated current channel information to the BS through a dedicated channel according to a current channel status, when a current channel status is different from a previous channel status as a result of monitoring a channel status of a downlink channel. The MS may transmit to the BS a control signal directing the BS to decode a dedicated channel through another control channel other than the dedicated channel, before transmitting current channel information to the BS.

Figure 11:
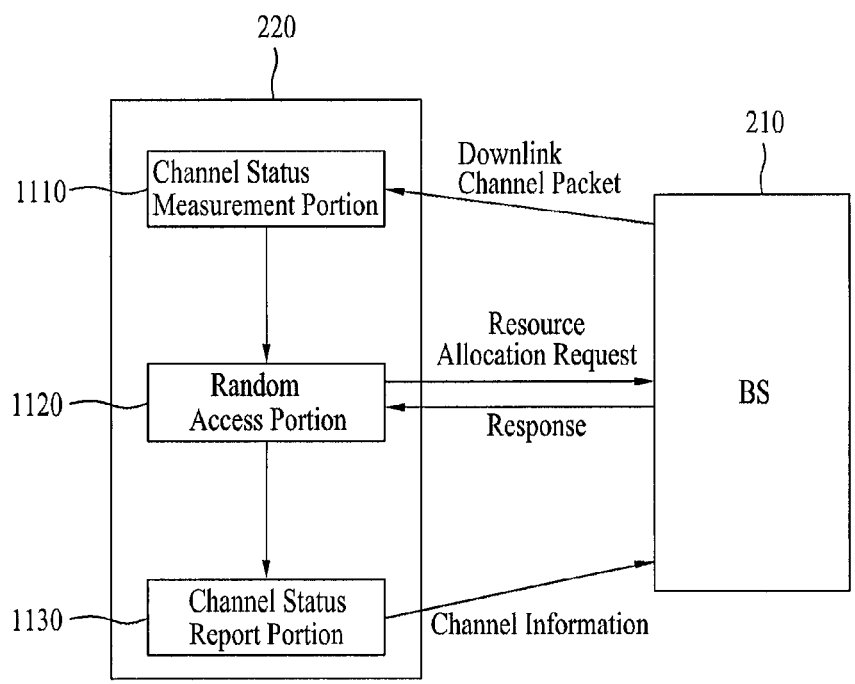
FIG. 11 is a block diagram of an MS according to an exemplary embodiment of the present invention.

FIG. 11 is a block diagram of a mobile station according to an exemplary embodiment of the present invention.

A mobile station 220 includes a channel status measurement portion 110, a random access portion 1120, and a channel status report portion 1130.

The channel status measurement portion 1110 monitors a channel status of a downlink channel and measures a SINR, a CINR, a BER, a FER, etc. of a channel. Moreover, the channel status measurement portion 110 may determine whether the status of the downlink channel varies in consideration of information reflecting the channel status of RI, PMI, etc.

The random access portion 1120 requests a BS 210 to allocate resources for current channel information transmission through an RACH, when it is determined that it is necessary to transmit a current channel status as a result of monitoring the downlink by the channel status measurement portion 1110.

The channel status report portion 1130 transmits updated current channel information to the BS 210 according to a current channel status through the RACH, when resource allocation of the BS 210 is completed.

Figure 12:
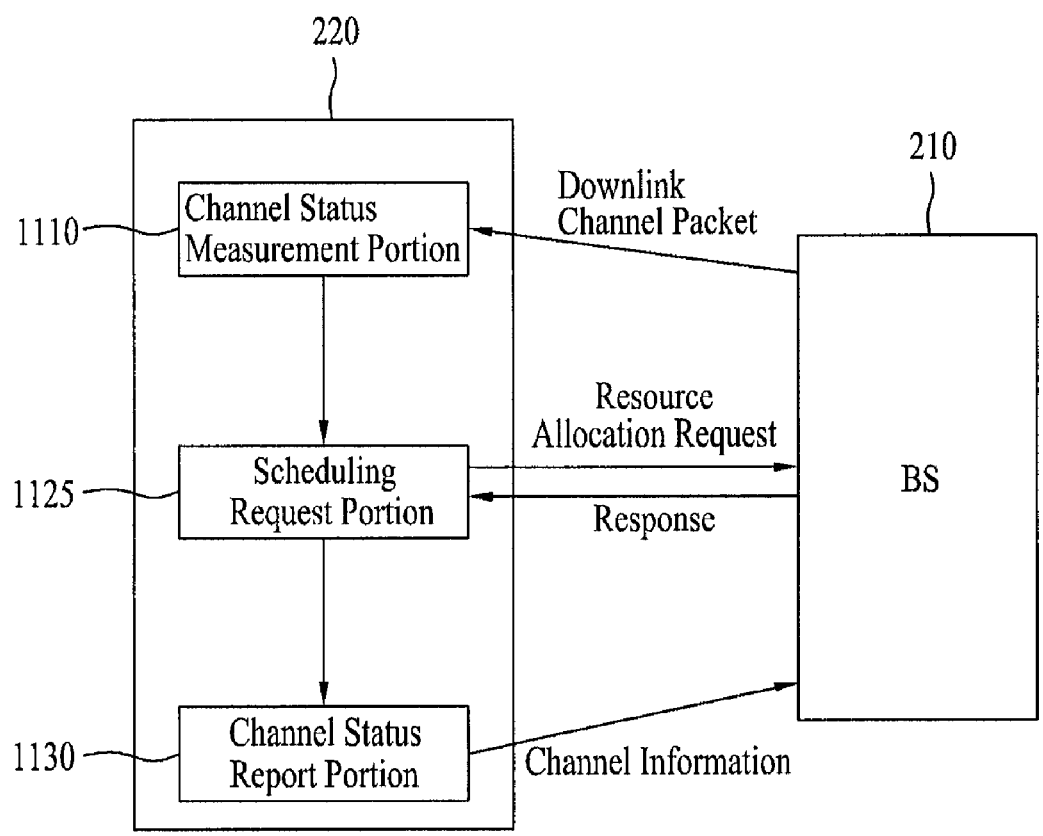
FIG. 12 is a block diagram of an MS according to another exemplary embodiment of the present invention.

FIG. 12 is a block diagram of a mobile station according to another exemplary embodiment of the present invention.

A mobile station 220 includes a channel status measurement portion 110, a scheduling request portion 1125, and a channel status report portion 1130.

The channel status measurement portion 1110 monitors a channel status of a downlink channel.

The scheduling request portion 1120 requests a BS 210 to allocate resources for current CQI transmission through a scheduling request channel, when it is determined that it is necessary to transmit a current channel status as a result of monitoring the downlink by the channel status measurement portion 1110.

The channel status report portion 1130 transmits updated current channel information to the BS 210 according to a current channel status through the scheduling request channel, when resource allocation of the BS 210 is completed.

Figure 13:
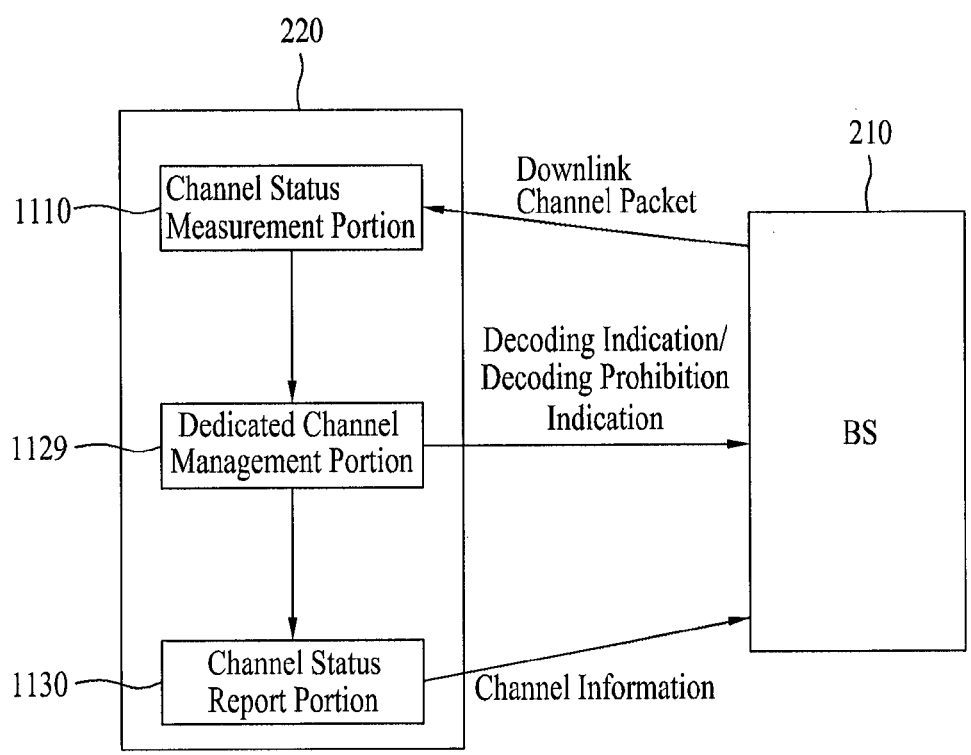
FIG. 13 is a block diagram of an MS according to a further exemplary embodiment of the present invention.

FIG. 13 is a block diagram of an MS according to a further exemplary embodiment of the present invention.

In FIG. 13, it is assumed that a dedicated channel for transmitting channel information is allocated to an MS.

A channel status measurement portion 1110 monitors a channel status of a downlink channel.

A dedicated channel management portion 1129 transmits a control signal directing the BS 210 not to decode the dedicated channel, when it is not necessary to transmit current channel information. The dedicated channel management portion 1129 may transmit a control signal directing the BS 20 to decode the dedicated channel, when it is determined that the current channel status information is required to be transmitted to the BS.

A channel status report portion 1130 transmits updated current channel information to the BS 210 according to a current channel status through the dedicated channel allocated to the MS 220, when resource allocation of the BS 210 is completed.

A mobile station 220 includes a channel status measurement portion 110, a scheduling requesting portion 1125, and a channel status report portion 1130.

The channel status measurement portion 1110 monitors a channel status of a downlink channel.

The channel status requesting portion 1130 transmits updated current channel information to the BS 210 when it is determined that the channel status needs to be transmitted as a result of monitoring the downlink by the channel status measurement portion 1110.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a method for transmitting channel information to a BS according to determination of a receiving stage and resource allocation states of a transmitting stage and may be applied to a channel information transmitting/receiving algorithm of a mobile communication system and to an MS using the same. The present invention may be applied irrespective of a type of a sequence used between the transmitting stage and the receiving stage and can provide flexibility to a used control signal system.

The invention claimed is:

1. A method of transmitting channel information, the method comprising:

requesting, by a mobile station (MS) through a random access channel (RACH), a base station (BS) to allocate a resource for transmitting channel information, if it is determined that transmission of a channel status of a downlink channel is necessary as a result of monitoring the channel status; and transmitting, from the MS through the RACH to the BS, the channel information which is updated according to the channel status if the resource allocation is completed, wherein the requesting the BS to allocate the resource comprises requesting the BS to allocate the resource through the RACH, if the channel information becomes different from previous channel information, a previous report on the channel status has an error, or the channel status is not suitable for a transmission mode.

2. The method of claim 1, wherein the transmitting the channel information comprises transmitting to the BS an identifier of the MS simultaneously with or sequentially to the channel information.

3. The method of claim 1, wherein the RACH is dedicatedly allocated to transmit the channel information.

4. The method of claim 1, wherein the requesting the BS to allocate the resource comprises transmitting an access reason to the BS through the RACH if the RACH is not dedicatedly allocated to transmit the channel information.

5. The method of claim 4, wherein the requesting the BS to allocate the resource comprises simultaneously transmitting an access sequence and the access reason to the BS.

6. A method of transmitting channel information, the method comprising:

requesting, by an MS through a scheduling request channel, that a BS allocate a resource for transmitting channel information, if transmission of a channel status of a downlink channel is necessary as a result of monitoring the channel status; and transmitting, from the MS through the scheduling request channel to the BS, the channel information which is updated according to the channel status if the resource allocation is completed, wherein the requesting that the BS allocate the resource comprises transmitting an access reason to the BS if the resource allocated by the BS is not sufficient for transmission of the channel information.

7. The method of claim 6, wherein the requesting that the BS allocate the resource comprises transmitting a scheduling request to the BS.

8. The method of claim 6, wherein the requesting that the BS allocate the resource comprises adding the access reason to a scheduling request.

9. The method of claim 6, wherein the requesting that the BS allocate the resource comprises adding a buffer size necessary for the MS to a scheduling request.

10. The method of claim 6, wherein the requesting that the BS allocate the resource comprises adding the amount of the resource necessary for the MS to a scheduling request.

11. A method of transmitting channel information, the method comprising:
    transmitting, from an MS to a BS, a control signal directing the BS not to decode a dedicated channel, wherein the dedicated channel is used to transmit channel information; and
    transmitting, from the MS through the dedicated channel to the BS, the channel information which is updated according to a channel status, if it is determined that transmission of the channel status of a downlink channel is necessary as a result of monitoring the channel status by the MS.

12. The method of claim 11, wherein transmitting the channel information to the BS comprises transmitting from the MS to the BS a control signal which directs the BS to decode the dedicated channel through a channel other than the dedicated channel.

* * * * *